United States Patent [19]
Lignell et al.

[11] Patent Number: 5,744,502
[45] Date of Patent: Apr. 28, 1998

[54] METHOD FOR INCREASING THE PRODUCTION OF/IN BREEDING AND PRODUCTION ANIMALS IN THE POULTRY INDUSTRY

[75] Inventors: Åke Lignell, Värmdö; Curt Nicolin, Grödinge; Lars-Håkan Larsson; Johan Inborr, both of Lidköping, all of Sweden

[73] Assignee: Astacarotene AB, Gustavsberg, Sweden

[21] Appl. No.: 793,803

[22] PCT Filed: Sep. 19, 1995

[86] PCT No.: PCT/SE95/01061

§ 371 Date: Apr. 30, 1997

§ 102(e) Date: Apr. 30, 1997

[87] PCT Pub. No.: WO96/08977

PCT Pub. Date: Mar. 28, 1996

[30] Foreign Application Priority Data

Sep. 19, 1994 [SE] Sweden ............................ 9403147

[51] Int. Cl.$^6$ ................ A23K 1/18; A23K 1/16
[52] U.S. Cl. ........................................... 514/725
[58] Field of Search ................................ 514/725

[56] References Cited

FOREIGN PATENT DOCUMENTS 4 100 739 A1  7/1992  Germany.

OTHER PUBLICATIONS

Hencken, *Poultry Science*, vol. 71, 1992, pp. 711–717.
Ranström et al., *Phytochemistry*, vol. 20, No. 11, 1981, pp. 2561–2564.
Pinchasov et al., Poult. Sci., 71(9), 1992, 1436–1441.

Primary Examiner—Phyllis G. Spivack
Attorney, Agent, or Firm—Bacon & Thomas

[57] ABSTRACT

The present invention discloses a method of increasing the production of/in breeding and production animals in the poultry industry by administering an agent which consists of at least one type of xanthophylles, preferably astaxanthin, in the feed to animals.

5 Claims, No Drawings

METHOD FOR INCREASING THE PRODUCTION OF/IN BREEDING AND PRODUCTION ANIMALS IN THE POULTRY INDUSTRY

This application is a 371 of PCT/SE95/01061 filed Sep. 19, 1995.

The present invention relates to an agent for increasing the production of/in breeding and production animals in the poultry industry, to a method of increasing the production with said agent and the use of said agent. The agent consists of at least one type of xanthophylles, preferably naturally produced astaxanthin. It is administered in the feed to breeding and production animals, in the poultry industry, to obtain increased production thereof.

BACKGROUND

In the poultry industry the production of/in breeding and production animals is of great importance to the economy. The problem of low fertility leads to low egg-production and poor hatching results, which reduces the income and raises the production costs. The newly-hatched young birds are subjected to a lot of stress by vaccinations, transports, starvation and changes of environment during the first period of life, which causes infections and sometimes high mortality. The poultry industry and suppliers to the industry has worked for decades on this complex of problems in order to find economical solutions which can also be accepted by the consumers.

In feeding trials using naturally produced astaxanthin mixed in the feed to breeding hens for the purpose of enhancing the yellow colour of the yolks it was surprisingly found that the astaxanthin also improved the production of eggs, the percentage of hatching and the state of health of the hens. Moreover, the consumption of feed went down.

The reason for the enhanced production yield when astaxanthin enriched feed was used is not known, but it can be assumed to be due to antioxidative properties of the astaxanthin and hence the ability to scavenge so-called free radicals. The other xanthophylles do also have antioxidative properties. However, in biological tests astaxanthin was proven to possess clearly the best antioxidative properties compared to other carotenoids (Miki W., 1991, Pure and Appl Chem 63 (1): 141–146).

Astaxanthin belongs to the xanthophylles, which is a large group of carotenoids containing oxygen in the molecule in addition to carbon and hydrogen. They exist abundantly in birds, fishes and crustaceans, and give many of these animals their typical pigmentation. However, they cannot themselves produce xanthophylles so they are entirely dependent on the contents of the feed for their need. The carotenoids are newly produced by plants, fungi and some bacteria.

Xanthophylles have since long been used in the feed for laying hens and in some parts of the world in the feed for broilers. The purpose has solely been to pigment the product, the yolk or fat and skin tissue, to satisfy the demands of the consumers. As sources for pigment both naturally produced xanthophylles and synthetically produced ones have been used (Hencken H., 1992, Poultry Science 71:711–717, Karunajeewa H. & A. Hoffman, 1992, Arch für Geflugelkunde 56(3):109–112).

In the feed for laying hens on the Swedish market there are predominantly used lucerne and grass meal which contain lutein, corn products containing zeaxanthin and paprika which contains the xanthophyll capsanthin. As an alternative Algatech AB, Sweden, recently introduced naturally produced astaxanthin on the Swedish market.

It has not previously been known that xanthophylles, and among them astaxanthin, have the ability to increase the production of/in breeding and production animals in the poultry industry.

DESCRIPTION OF THE INVENTION

The present invention is in a first aspect directed to an agent for increasing the production of/in breeding and production animals in the poultry industry, whereby the agent consists of at least one type of xanthophylles.

In a preferred embodiment the type of xanthophylles is astaxanthin. In a particularly preferred embodiment the astaxanthin exists in a form in which it is esterified with fatty acids. The last mentioned form of astaxanthin may be produced by cultivation of the alga *Haematococcus sp.*

The agent according to the invention may thus consist of a mixture of different types of xanthophylles or different forms of the same xanthophyll, such as a mixture of synthesized astaxanthin and naturally produced astaxanthin.

Another aspect of the invention is directed to a method of increasing the production of/in breeding and production animals in the poultry industry, in which an agent which consists of at least one type of xanthophylles is administered in the feed to the animals.

In an embodiment of the method the type of xanthophyll is preferably astaxanthin. In a preferred embodiment of the method according to the invention astaxanthin which exists in the form esterified with fatty acids is administered. The amount of agent administered is suitably in the range of 1 to 50 mg agent per kg feed.

Still another aspect of the invention is directed to the use of an agent which consists of at least one type of xanthophylles for increasing the production of/in breeding and production animals in the poultry industry by administering said agent in the feed to said animals.

Also in this aspect of the invention the preferred type of xanthophyll is astaxanthin, which in a particularly preferred embodiment exists in a form esterified with fatty acids.

DESCRIPTION OF TESTS MADE AND PREPARATION OF THE AGENT

The agent used in the tests was the xanthophyll astaxanthin which was produced via algae, and the animals used were breeding hens and chickens.

Astaxanthin from other sources and other xanthophylles as well should give similar results on both breeding hens and chickens. An advantage with using astaxanthin from algae is, however, that the astaxanthin exists in a form esterified with fatty acids (Renström B. et al, 1981, Phytochem 20(11):2561–2564), which contributes to a more efficient uptake in the animal compared to free astaxanthin. The astaxanthin is thereby also more stable during handling and storage than free astaxanthin.

The naturally produced astaxanthin can be obtained also from fungi and crustaceans, in addition to from algae. The astaxanthin used in the present test was produced via culturing of the algae *Haematococcus sp.* in the way described below.

*Haematococcus sp.* is a single-cell green alga belonging to the order Vovocales, family Chlamydomonadaceae. The reproduction takes normally place through asexual cell-division, but isogam sexual reproduction occures sporadically. When the alga is batch-cultivated it grows in the form of scourge-equipped so-called macrozoides. When the nutrient content of the medium decreases and becomes limiting for continuing growth the cells loose the scourge and go into a palmella stage and form thereafter so-called haematocystes. They are characterized by a strong cell wall which encloses the cell, which in turn is rich in fatty vacuoles in which astaxanthin is accumulated. The haematocyst is a resting stage for the alga by which it can survive periods of dryness etc.

For the production a species or strain of *Haematococcus sp.* which grows fast and produces high titres of astaxanthin is suitably selected. A number of different species and strains of Haematococcus are available via so-called culture collections, and there is also the possibility of isolating a suitable strain from wild-growing populations. A suitable species is *H. pluvialis* which is available from NIVA, Norway.

Stock cultures of the alga is kept in axenic culture in a medium suitable therefore, see Table 1. The temperature should be approximately +15° C. and the light intensity about 50 $\mu Em^{-2}S^{-1}$.

TABLE 1

| Composition of growth medium for Haematococcus sp. | |
| --- | --- |
| $Ca(NO_3)_2 \times 4\ H_2O$ | 85 $\mu M$ |
| $KH_2PO_4$ | 91 $\mu M$ |
| $MgSO_4 \times 7\ H_2O$ | 203 $\mu M$ |
| $NaHCO_3$ | 189 $\mu M$ |
| EDTA $Na_2$ | 7 $\mu M$ |
| EDTA FeNa | 6 $\mu M$ |
| $H_3BO_3$ | 40 $\mu M$ |
| $MnCl_2 \times 4\ H_2O$ | 7 $\mu M$ |
| $(NH_4)_6Mo_7O_{24} \times 4\ H_2O$ | 0.8 $\mu M$ |
| Vitamin $B_{12}$ | 10 $\mu g/l$ |
| Vitamin $B_1$ | 10 $\mu g/l$ |
| Biotin | 10 $\mu g/l$ |
| $NaNO_3$ | 940 $\mu M$ |
| $NaH_2PO_4 \times 12H_2O$ | 100 $\mu M$ |

Inoculation material is taken from the stock cultures for the production culturing. The cell density at inoculation is >5000 cells/ml and the culture is reinoculated to a larger volume as the cell density reaches approximately 200 000 cells/ml, which will take approximately five days. At cultivation of the algal material the temperature is kept around +15° C. and the light intensity should be approximately 100 $\mu Em^{-2}S^{-1}$. The same composition of the medium is used as for the stock cultures. The cultures are agitated with compressed air which is enriched with 1–5% $CO_2$. Alternatively, $CO_2$ may be added separately in such an amount that the pH value of the medium is kept between 6.5–8.5.

When the volume of the algal culture reaches approximately 100 liters it is used for inoculation of a production unit, which consists of a device wherein the algal cells can be exposed to light also when the culture volume may amount to 2–100 $m^3$. Such a device may be designed as a shallow pond, a construction of transparent tubes, panels orientated against a source of light or alternatively, as in the example, a tank equipped with submerged lighting in the form of fluorescent lamps.

The production vessle is inoculated with a cell density of >5000 cells/ml and the medium is enriched with nutrient salts in accordance with Table 1. The temperature is kept at approximately +25° C. and the light intensity should be 100 $\mu Em^{-2}S^{-1}$. The culture is agitated with the aid of compressed air. Carbon dioxide is added to the culture so that the pH value will be between 6.5–8.5. When the nutrition in the medium begins to cease the algal cells turn over to the palmella stage and begin to synthesize astaxanthin. In this connection the light intensity is suitably increased to approximately 250 $\mu Em^{-2}S^{-1}$, the temperature to +30° C. and NaCl is added to the medium so that a salt content of 0.1–0.3% is obtained. These changes are made in order to accelerate the production of astaxanthin. In 10–20 days the cells have produced haematocysts and the cell density has increased to 5–10×$10^5$ cells/ml.

The cells are separated from the medium via sedimentation or via centrifugation. The harvested algal cells in the form of a paste are then passed through a homogenizer in order to brake the cell walls. The paste consisting of cells having broken cell walls may then be taken care of in two alternative ways. The paste may either be dried so that a dry powder is obtained. The drying should be done as leniently as possible so that the astaxanthin will not be degraded. An alternative to drying the paste is to extract the pigment from the paste. Since astaxanthin is highly hydrofobic the extraction can be made with a suitable oil, e.g. soy oil.

The amount of astaxanthin in the feed, which has been used in the tests, has been in between 1–50 mg astaxanthin/kg feed.

RESULTS

In feeding tests with the above prepared, naturally produced astaxanthin mixed in the feed to breeding hens the following results were obtained, in addition to enhanced yellow colour of the yolks, improved egg production, hatching percentage and state of health of the hens. Moreover the feed consumption went down. Among the chickens which originated from hens, which had received astaxanthin in the feed, the mortality caused by yolk sac inflammation was reduced while the growth and feed utilization were improved during the three first weeks of living compared to chickens whose mothers had not received astaxanthin in their feed. Eggs from hens who had been fed with astaxanthin-enriched feed showed increased resistance to infection by salmonella bacteria during storage compared to eggs from hens who had not received astaxanthin-enriched feed. The reason for this is probably the "stronger" membrane which these eggs present around the egg and yolk.

A further observation made on eggs from hens who have received astaxanthin enriched feed is that these eggs retained the characteristics of fresh eggs during longer periods of storage than other eggs. Thus, e.g. the gelatinous consistency of the egg white and the "uniting function" of the membrane around the yolk were retained during a considerably longer period.

When astaxanthin was added to slaughter-chicken feed the mortality and the number of animals eliminated due to sickness were reduced. The growth and the feed-utilization were improved compare to those groups which did not receive astaxanthin.

In summary, it can be concluded that naturally produced astaxanthin improves the production results of both breeding hens and their chickens. Therefore, the invention contributes to considerable improvement of the production results in the poultry industry.

We claim:

1. A method of increasing the production of/in breeding and production animals in the poultry industry comprising feeding said animals with a feed supplemented with at least one type of xanthophylles.

2. The method according to claim 1 wherein the type of xanthophyll is astaxanthin.

3. The method according to claim 2 wherein the astaxanthin exists in a form esterified with fatty acids.

4. The method according to claim 2 wherein the supplementation is in the range of 1 to 50 mg astaxanthin per kilogram feed.

5. The method according to claim 3 wherein the supplementation is in the range of 1 to 50 mg astaxanthin per kilogram feed.

* * * * *